(12) United States Patent
Chelarescu et al.

(10) Patent No.: US 10,740,461 B2
(45) Date of Patent: *Aug. 11, 2020

(54) IDENTIFICATION OF ENTITY PERFORMING OPERATION ON LOCAL FILE(S) AND NOTIFICATION TO REDUCE MISUSE RISK

(71) Applicant: Microsoft Technology Licensing, LLC, Redmond, WA (US)

(72) Inventors: Filip Chelarescu, Kirkland, WA (US); John D. Rodrigues, Woodinville, WA (US); Steven J. Bailey, Bellevue, WA (US); Adam C. Czeisler, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/413,808

(22) Filed: May 16, 2019

(65) Prior Publication Data
US 2019/0272374 A1 Sep. 5, 2019

Related U.S. Application Data

(63) Continuation of application No. 15/367,432, filed on Dec. 2, 2016, now Pat. No. 10,331,885.

(51) Int. Cl.
*G06F 21/55* (2013.01)
*G06F 21/62* (2013.01)

(52) U.S. Cl.
CPC ........ *G06F 21/554* (2013.01); *G06F 21/6218* (2013.01)

(58) Field of Classification Search
CPC .......................... G06F 21/554; G06F 21/6218
USPC .......................................................... 726/22
See application file for complete search history.

(56) References Cited

U.S. PATENT DOCUMENTS

| | | | |
|---|---|---|---|
| 2014/0026181 A1* | 1/2014 | Kiang | G06F 21/60 726/1 |
| 2014/0026182 A1* | 1/2014 | Pearl | G06Q 10/103 726/1 |
| 2015/0163206 A1* | 6/2015 | McCarthy | G06F 21/6227 713/171 |

* cited by examiner

*Primary Examiner* — Khalil Naghdali
(74) *Attorney, Agent, or Firm* — Michael Best & Friedrich LLP (57) ABSTRACT

Identification of an entity performing a deletion or modification action on locally stored files and notification to mitigate risks to cloud stored files is provided. A local or remote file watcher may monitor locally stored files and detect a deletion or modification action. The file watcher may also identify an entity performing the deletion or modification action. The entity may be an application, a process, a user other than the user that is the owner of the files, or the user himself/herself. The file watcher may further determine one or more alert conditions or rules associated with the affected file(s) and/or the entity, that is under which circumstances an alert is to be issued. The alert notification(s) may be issued to the user, an administrator, a cloud storage service, and/or a data protection service such that protective measures can be taken if necessary.

20 Claims, 8 Drawing Sheets

IDENTIFICATION OF ENTITY PERFORMING OPERATION ON LOCAL FILE(S) AND NOTIFICATION TO REDUCE MISUSE RISK

RELATED APPLICATIONS

This application is a continuation of U.S. application Ser. No. 15/367,432 filed Dec. 2, 2016, the entire content of which is incorporated by reference herein.

BACKGROUND

Increasingly, cloud storage providers are utilized for storing and/or sharing data across multiple clients, where the cloud storage providers have engines that automatically synchronize the data between the clients. However, complaints are frequently received that the cloud storage providers are deleting or modifying data in the cloud via unintended user actions on the clients or actions by nefarious software or hackers. Because the data is synchronized to the cloud, the delete or modification may be propagated to the cloud which further causes the delete to replicate to the other clients.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to identification of an entity performing a deletion or modification action on locally stored files and notification to mitigate risks to cloud stored files. In some examples, a deletion or modification action on one or more locally stored files may be detected. An entity performing the deletion or modification action may be identified and one or more alert conditions associated with the affected file(s) and/or the entity may be determined. If the alert condition(s) are satisfied, a notification may be issued to a user, a cloud storage service, and/or a data protection service.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, embodiments are directed to identification of an entity performing a deletion or modification action on locally stored files and notification to mitigate risks to cloud stored files. A local or remote file watcher may monitor locally stored files and detect a deletion or modification action. The file watcher, which may be part of a synchronization engine, a separate application, or an operating system, may also identify an entity performing the deletion or modification action. The entity may be an application, a process, a user other than the user that is the owner of the files, or the user himself/herself. The file watcher may further determine one or more alert conditions or rules associated with the affected file(s) and/or the entity, that is under which circumstances an alert is to be issued. For example, if a file is deleted by an unknown process, a predefined percentage of files are deleted by any entity, etc., an alert may be issued. The alert notification(s) may be issued to the user, an administrator, a cloud storage service, a local application, and/or a data protection service such that protective measures can be taken if necessary.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing and/or implementing data protection features for data stored at a storage service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
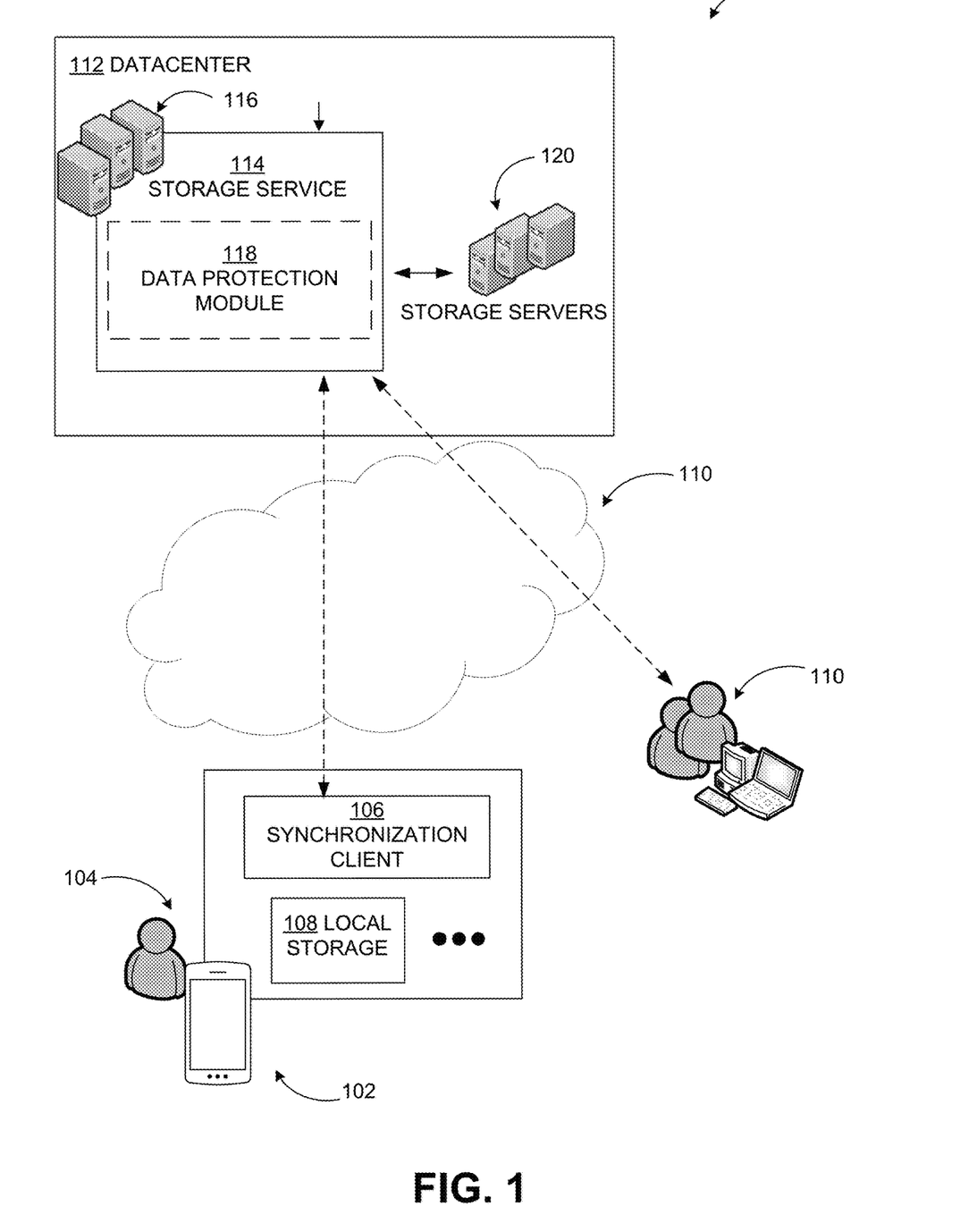
FIG. 1 includes an example network environment where a system to provide identification of an entity performing a deletion or modification action on locally stored files and notification to mitigate risks to cloud stored files may be implemented.

FIG. 1 includes an example network environment where a system to provide identification of an entity performing a deletion or modification action on locally stored files and notification to mitigate risks to cloud stored files may be implemented.

As illustrated in diagram 100, an example system may include a datacenter 112 hosting a cloud-based storage service 114 configured to provide storage for and enable sharing of data that may be accessed across multiple devices and users. The datacenter 112 may include one or more processing servers 116 configured to execute the storage service 114, among other components. In some embodiments, at least one of the processing servers 116 may be operable to execute a data protection module 118 of the storage service 114, where the data protection module 118 may be integrated with the storage service 114 to prevent protected data from being deleted and/or modified at the storage service 114 to avoid accidental or nefarious data deletions or modifications from being propagated universally across the storage service 114 and/or multiple other devices. In other embodiments, this function may be inherently present within the storage service 114 itself. The datacenter 112 may also include one or more storage servers 120 configured to manage one or more data stores comprising data associated with the storage service 114 and/or data protection module 118. As described herein, the storage service 114 and/or data protection module 118 may be implemented as software, hardware, or combinations thereof.

In some embodiments, the storage service 114 may be configured to interoperate with various applications to synchronize data stored locally on user associated devices with the same data stored remotely at the storage service 114. For example, as illustrated in the diagram 100, a user 104 may execute a thin (e.g., a web browser) or a thick (e.g., a locally installed client application) version of synchronization client 106 through the device 102 with which the storage service 114 may be configured to integrate and interoperate with over one or more networks, such as network 110. The synchronization client 106 may be an application hosted by the storage service, for example. The device 102 may include a desktop computer, a laptop computer, a tablet computer, a vehicle mount computer, a smart phone, or a wearable computing device, among other similar devices. A communication interface may facilitate communication between the storage service 114 and the synchronization client 106 over the network 110.

In an example embodiment, the storage service 114 may be configured to receive data stored on local storage 108 of the device 102. The received data may be stored remotely at the storage service 114 within the storage servers 120, for example. Periodic synchronization between the data stored on local storage 108 of the device 102 and the content stored remotely at the storage service 114 may be performed to ensure a most updated version of the content is stored and/or shared at each location.

For example, the data protection module 118 may be configured to provide a data protection feature for a portion of the data stored at the storage service 114. If some of the locally stored data is deleted or modified accidentally or by a malicious actor, the local impact may be carried over to the cloud stored data at synchronization, as well as, to any other devices that share the data through the cloud storage. In some examples, the cloud storage service may be provided with insight which automated process or which user deleted or modified a user's files in their local storage. The user may also be provided the information allowing both the cloud storage service and the user to take measures, if necessary, to protect the cloud-stored files and/or recover the deleted/modified files. Furthermore, a profile may be built about deletions and modifications ensuring that if the user behaves outside that profile (e.g. familiar processes), the system may potentially stop and ask/challenge the user.

In some examples, certain thresholds such as a static number of files or a percentage of files in a user's local storage may be defined as alert thresholds. If files exceeding the threshold are deleted or modified by a non-user process, the user may be notified. Actions such as blocking the delete or modification from synchronizing to the cloud storage or restoring the deleted files from recycle bin may be automatically taken or suggested to the user. Users, cloud storage service, and/or a data protection service (e.g., a virus protection service) may be provided with information such as which files were affected, when the operation was performed, by whom the operation was performed, and similar metadata. Furthermore, the user may also be presented with which process triggered the delete, and when, and be given options to prevent that process from doing further deletes in a given folder, or other folders. The user may be suggested to enable the file watcher on other folders if they found this feature useful.

Conventionally, some cloud-based storage services and/or providers may offer a selective synchronization functionality, which enables users the ability, per device, to select which data to synchronize up to the storage service or down to the device. However, when the selected data, such as a photograph, is deleted locally on a user device, that photograph may also be deleted from the cloud-based storage service. Therefore, if the user performs accidental deletes or modifications, or an application deletes or modifies data on behalf of the user without their knowledge, the deletions or modifications to the data may synchronize up to the storage service. Moreover, actions by nefarious software or hackers may cause deletions or modifications to the data at the storage service, where those deletions or modification may synchronize down to the device.

In an alternate embodiment, the data protection module 118 may be configured to automatically select the data protection feature for the portion of data stored at the storage service 114. For example, the data protection module 118 may automatically select the data protection feature for particular types of data, such as data comprising precious memories (e.g., photos or videos) or important documents (e.g., tax returns). Additionally, the data protection module 118 may employ machine learning techniques such that the data protection feature is automatically selected for data based on a past history and/or pattern of data the user 104 has selected to protect.

As described herein, embodiments are directed to identification of an entity performing a deletion or modification action on locally stored files and notification to mitigate risks to cloud stored files. User interactivity may be increased by enabling users or administrators to select the data protection feature to restrict deletions and/or modifications of the data stored at the storage service. Additionally, user efficiency may be increased when the storage service automatically selects the data protection feature based on a certain type of data and/or by employing machine learning techniques. Additionally, when the portion of data is locally deleted from or modified at a device, the storage service may place a hold on synchronization with the device reducing processor and memory usage along with bandwidth usage due to reduced device-to-server communications, as well as, enhancing reliability.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at client devices and remotely at cloud-based storage services.

Figure 2:
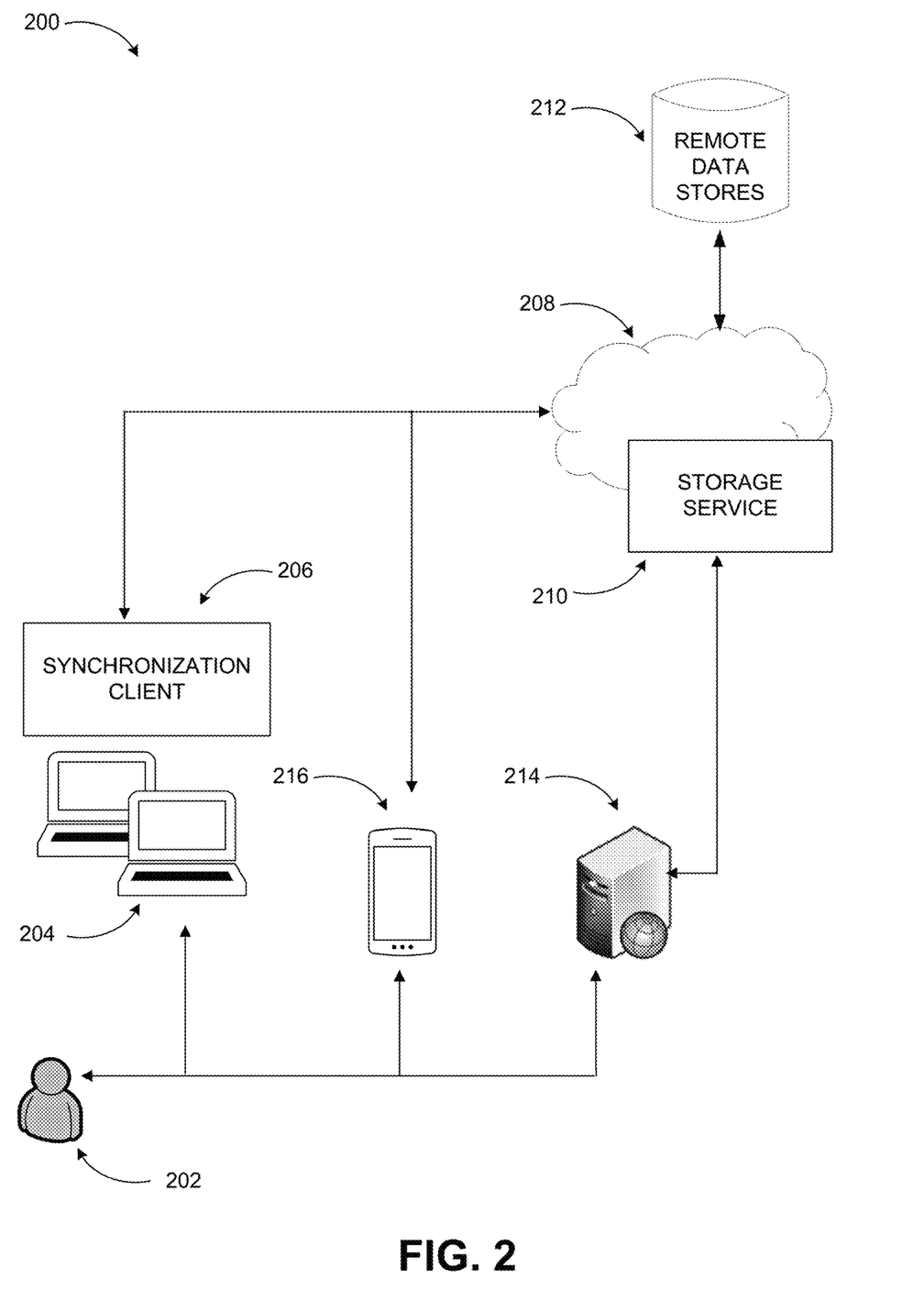
FIG. 2 includes an example diagram illustrating another example cloud storage system to provide identification of an entity performing a deletion or modification action on locally stored files and notification to mitigate risks to cloud stored files.

FIG. 2 includes an example diagram illustrating another example cloud storage system to provide identification of an entity performing a deletion or modification action on locally stored files and notification to mitigate risks to cloud stored files.

As shown in a diagram 200, a storage service 210 may be configured to receive data stored locally on one or more devices 204 associated with a user 202 (or administrator). The storage service 210 may receive the data over one or more networks, such as network 208, and the received data may be stored within one or more remote data stores 212 at the storage service 210, for example. Periodic synchronization between the data stored on the devices 204 and the data stored within one or more remote data stores 212 may be performed through a synchronization client 206 executed on the devices 204.

As discussed above, an authorized process, a user with access to the device other than the user who is the primary owner of the data, or an upgrade may accidentally delete or modify files in local storage. Furthermore, a malicious application or process may intentionally delete or modify the files as well causing further damage when the affected files are synchronized with the cloud storage.

In some embodiments, details or delete and/or modification operations on locally stored files (or folders) may be collected at an operating system level, recorded, and reported to a user, the storage service, and/or a data protection service (executed on a server or its client module on a local device). In other words, which processes delete or modify which files may be learned from the respective operating system. In other embodiments, automatic protection measures may be taken or suggested to the user. Detection and reporting of an entity performing the action(s) may help determine whether protective or recovery operations are needed or not.

Figure 3:
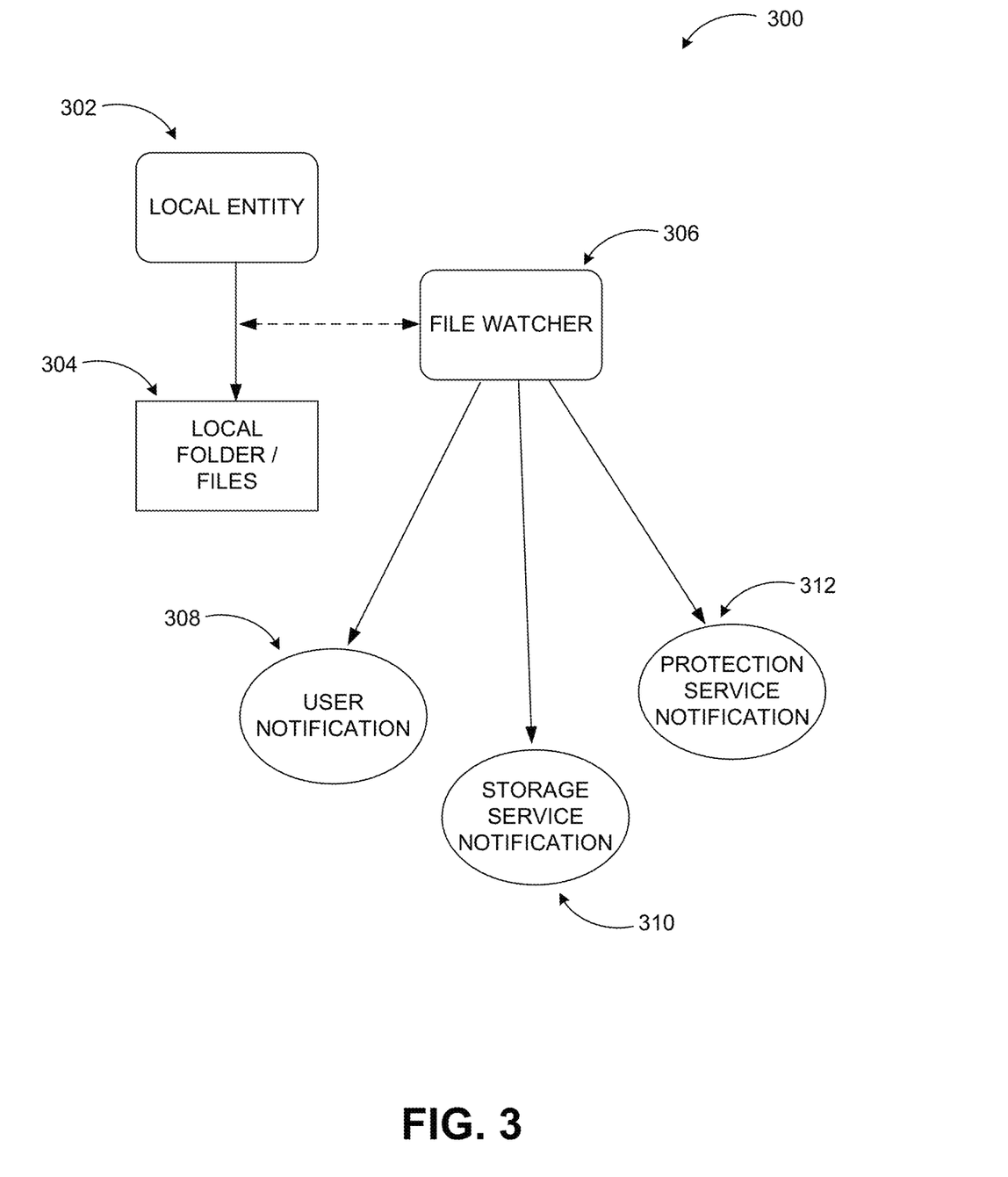
FIG. 3 includes a conceptual diagram illustrating an example process to provide identification of an entity performing a deletion or modification action on locally stored files and notification to mitigate risks to cloud stored files.

FIG. 3 includes a conceptual diagram illustrating an example process to provide identification of an entity performing a deletion or modification action on locally stored files and notification to mitigate risks to cloud stored files.

As shown in diagram 300, a local entity 302 may perform deletion or modification operations on one or more locally stored files or folders 304. The locally stored files or folders 304 may be part of data that is synchronized periodically or on-demand with a cloud-based storage service. The local entity 302 may be a user who is the primary owner of the locally stored data, a user other than the primary owner, but with access to the computing device, a local application or process, and/or a remote process or application. In some cases, the deletion or modification operations may be accidental or malicious. To detect accidental or malicious operations on the locally stored files or folders and prevent further damage at the cloud-based storage, a file watcher 306 may monitor the files or folders and report the operations if predefined alert conditions are met. The notifications may include, but are not limited to, a user notification 308, a storage service notification 310, and a data protection service notification 312.

The file watcher 306 may be a locally executed module or application and monitor files, folders, and a directory structure. A behavior of the file watcher may be defined by a set of rules and configurations. The rules may also define alert conditions, which result in notifications being sent and/or other actions being taken. The configurations may define how notifications are provided, types and amount of information to be included in the notification, and so on. In some examples, the file watcher 306 may be connected to a service that may manage multiple file watchers on different computing devices. In other examples, the file watcher 306 may be a component of the cloud storage service. In yet other examples, the file watcher 306 may be an independent application.

The rules for issuing notifications (or alerts) may be based on file types, file locations, number of files deleted or modified, percentage of files deleted or modified, or the entity performing the operation(s). For example, a word processing application modifying a word processing file may not trigger an alert, but an unknown process deleting or modifying the same file may; deletion of a single file by the user may not trigger an alert, but deletion of 10% of the locally stored files may. In some cases, user activity may be distinguished based on whether a single file is being processed or whether an application associated with the file is activated.

In a service model for the file watcher, detection and notification may also be based on operations on files of multiple users. For example, if the system detects similar type or number of files deleted or modified at local storages of multiple users, an alert may be issued even if individual thresholds are not reached. The file watcher may work in conjunction with local engines such as a directory engine to monitor processes and abnormal behavior. In further examples, the monitored local files may not necessarily be designated for synchronization with the cloud storage service.

Figure 4:
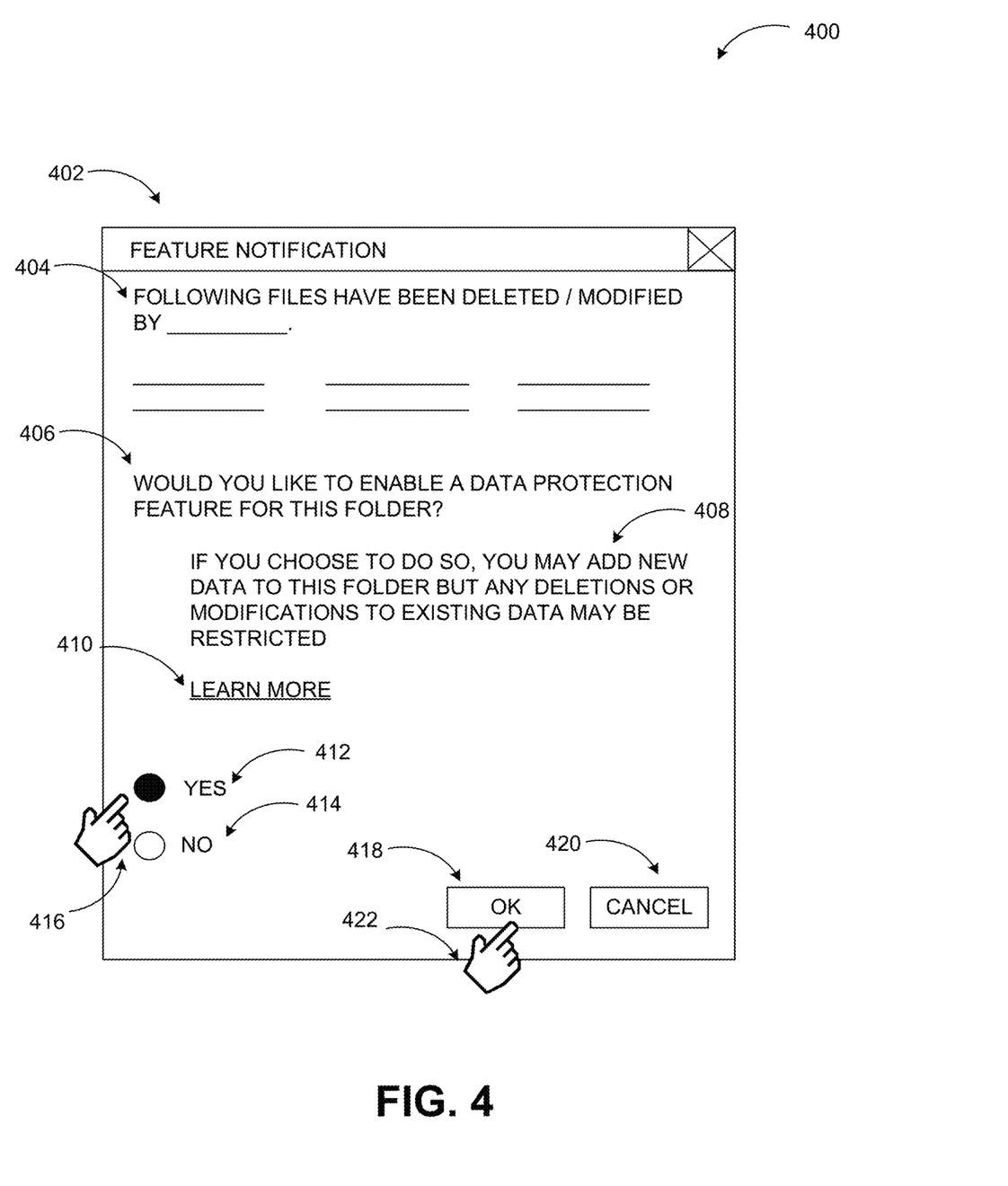
FIG. 4 illustrates an example notification in a system according to embodiments.

FIG. 4 illustrates an example notification in a system according to embodiments.

The notification process may be process-specific and prompt a user to decide whether they wish to prevent a process from deleting or modifying data in a particular folder (or all protected folders). In an example scenario, the synchronization client may display the data protection feature to the user as a feature notification 402 through a user interface associated with the synchronization client, as illustrated in diagram 400.

The feature notification 402 may be presented as a dialog box, a notification window, and/or a pane. In other examples, the notification may be provided as a text message, an email, a phone call, or similar communication methods. The feature notification 402 may include a main notification 404 and a prompt 406 followed by two possible selections ("yes" 412 and "no" 414). As illustrated, the main notification 404 may provide information about the file(s) (or folders) that are affected and the entity that performed the operation(s). The prompt 406 may inquire whether the user would like to enable a data protection feature for the folder. An explanation 408 following the prompt 406 may describe the effects and/or purpose of enabling the data protection feature for the folder. For example, the explanation 408 may indicate that if the data protection feature is enabled new data may be added to the folder but any deletions or modifications the existing data may be restricted. The explanation 408 may also indicate, for example, that the user will be notified of any suspicious behavior in the protected folder. A link 410 for more detailed information regarding these effects and/or purpose may also be provided.

The user may select 416 either "yes" 412 or "no" 414 in response to the prompt 406. If the user does not wish to enable the data protection feature, the user may select "no" 414, and then select 422 an "OK" command control 418. Alternatively, the user may select a "Cancel" command control 420. Without the data protection feature enabled, any changes, including additions, deletions, and/or modifications to data within the folder may be enabled at the storage service.

Figure 5:
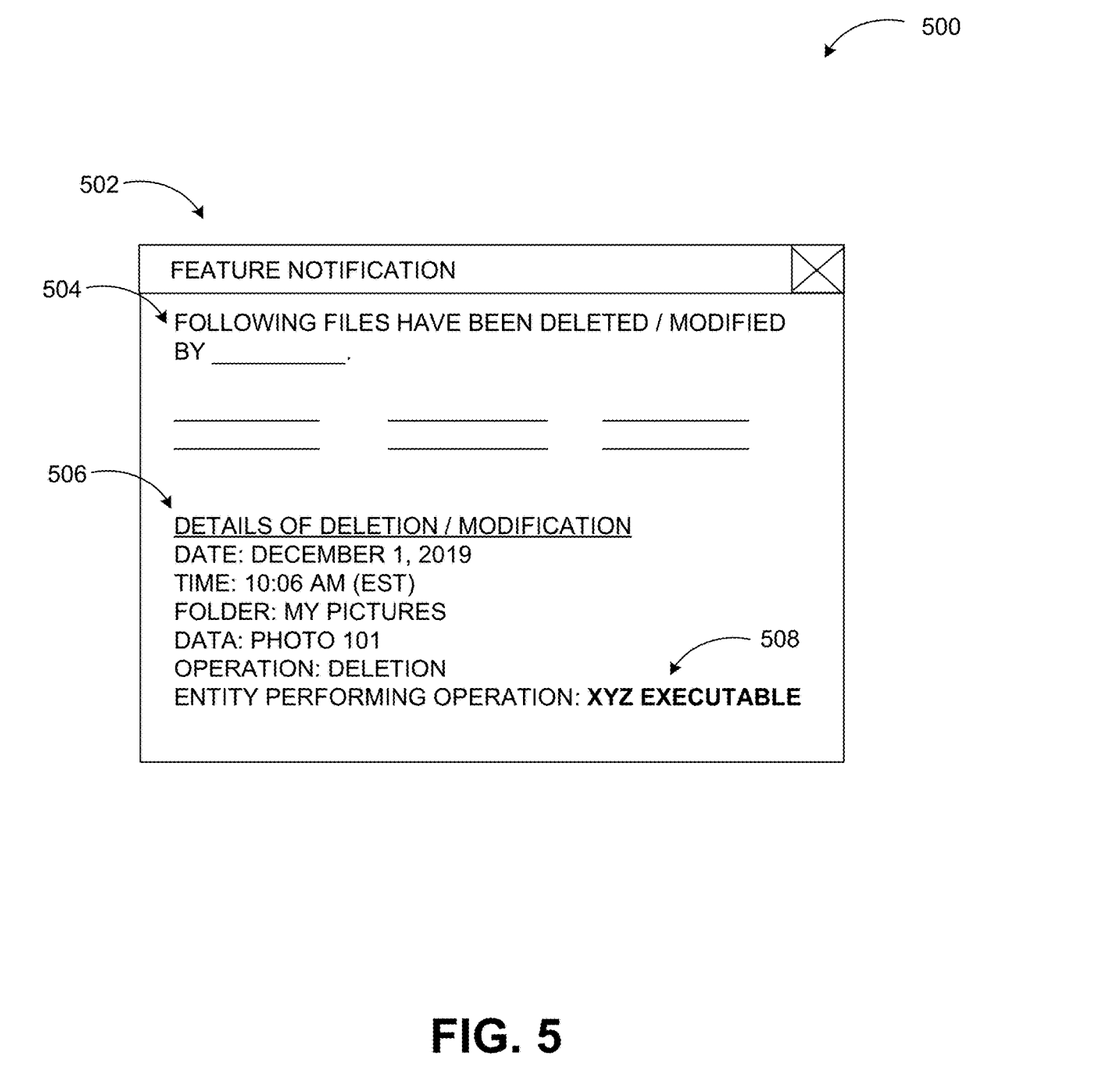
FIG. 5 illustrates another example notification in a system according to embodiments.

FIG. 5 illustrates another example notification in a system according to embodiments.

Diagram 500 shows another example notification 502, where a main notification 504 listing the files affected by the potentially accidental or malicious operation, the operation, and the entity performing the operation are listed. In some examples, details 506 of the operation may also be provide such as date and time of the operation, a folder in which the operation was performed, type of file(s) affected by the operation, and the entity 508 performing the operation in a prominent manner. In other examples, a table of all processes, and the number of files they affected may also be presented in a similar way.

The examples provided in FIGS. 1 through 5 are illustrated with specific systems, services, applications, modules, and notifications. Embodiments are not limited to environments according to these examples. Identification of an entity performing a deletion or modification action on locally stored files and notification to mitigate risks to cloud stored files may be implemented in environments employing fewer or additional systems, services, applications, engines, and user experience configurations. Furthermore, the example systems, services, applications, modules, and notifications shown in FIGS. 1 through 5 may be implemented in a similar manner with other values using the principles described herein.

Figure 6:
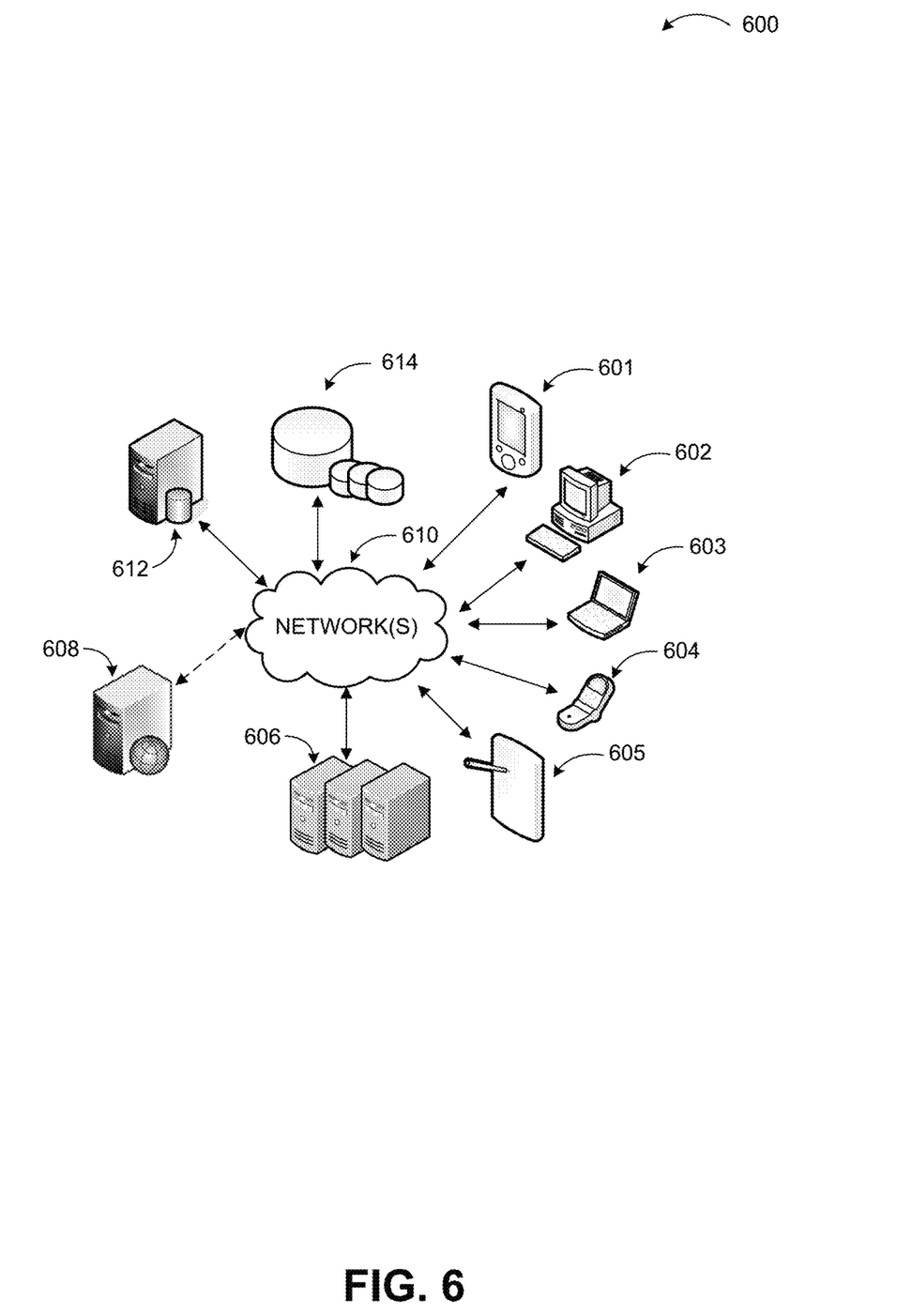
FIG. 6 is a networked environment, where a system according to embodiments may be implemented.

FIG. 6 is a networked environment, where a system according to embodiments may be implemented. In addition to locally installed applications (for example, synchronization client 106), a data protection module (for example, data protection module 118) may also be employed in conjunction with hosted applications and services (for example, a storage service 114) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 (client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for identification of an entity performing a deletion or modification action on locally stored files and notification to mitigate risks to cloud stored files. Furthermore, the networked environments discussed in FIG. 6 are for illustration purposes only. Embodiments are not limited to the example applications, engines, or processes.

Figure 7:
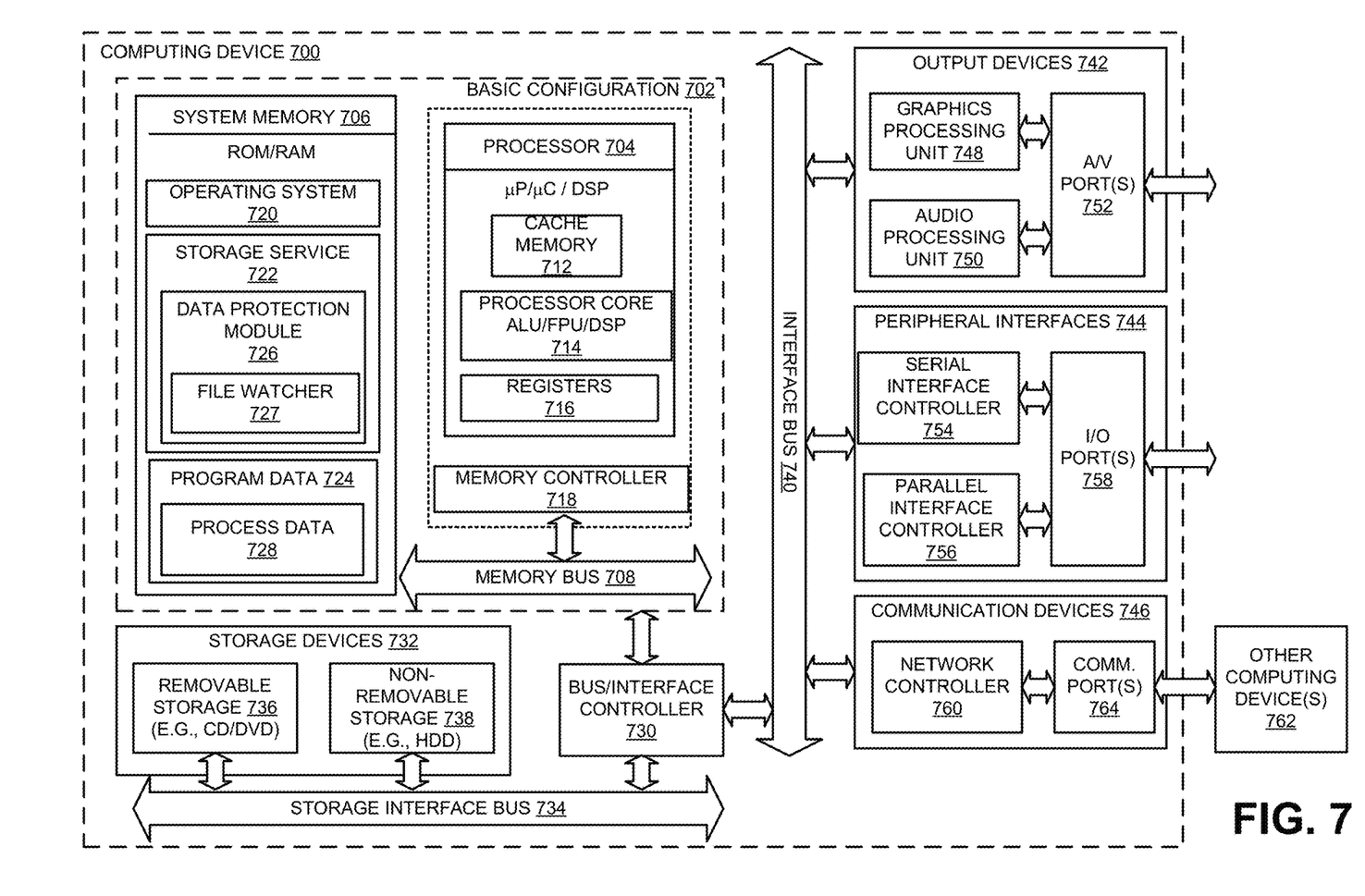
FIG. 7 is a block diagram of an example general purpose computing device, which may be used to provide identification of an entity performing a deletion or modification action on locally stored files and notification to mitigate risks to cloud stored files.

FIG. 7 is a block diagram of an example general purpose computing device, which may be used to provide identification of an entity performing a deletion or modification action on locally stored files and notification to mitigate risks to cloud stored files.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a storage service 722, and program data 724. The storage service 722 may include a data protection module 726, which may be an integrated module of the storage service 722. The data protection module 726 may include a file watcher module or engine 727, which may in some embodiments be implemented at a client device. The data protection module 726 in conjunction with the file watcher module or engine 727 may identify an entity performing a deletion or modification on one or more locally stored filed and issue notifications to mitigate risks to cloud stored files. The program data 724 may include, among other data, process data 728, such as the data stored at the storage service 722, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide identification of an entity performing a deletion or modification action on locally stored files and notification to mitigate risks to cloud stored files. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
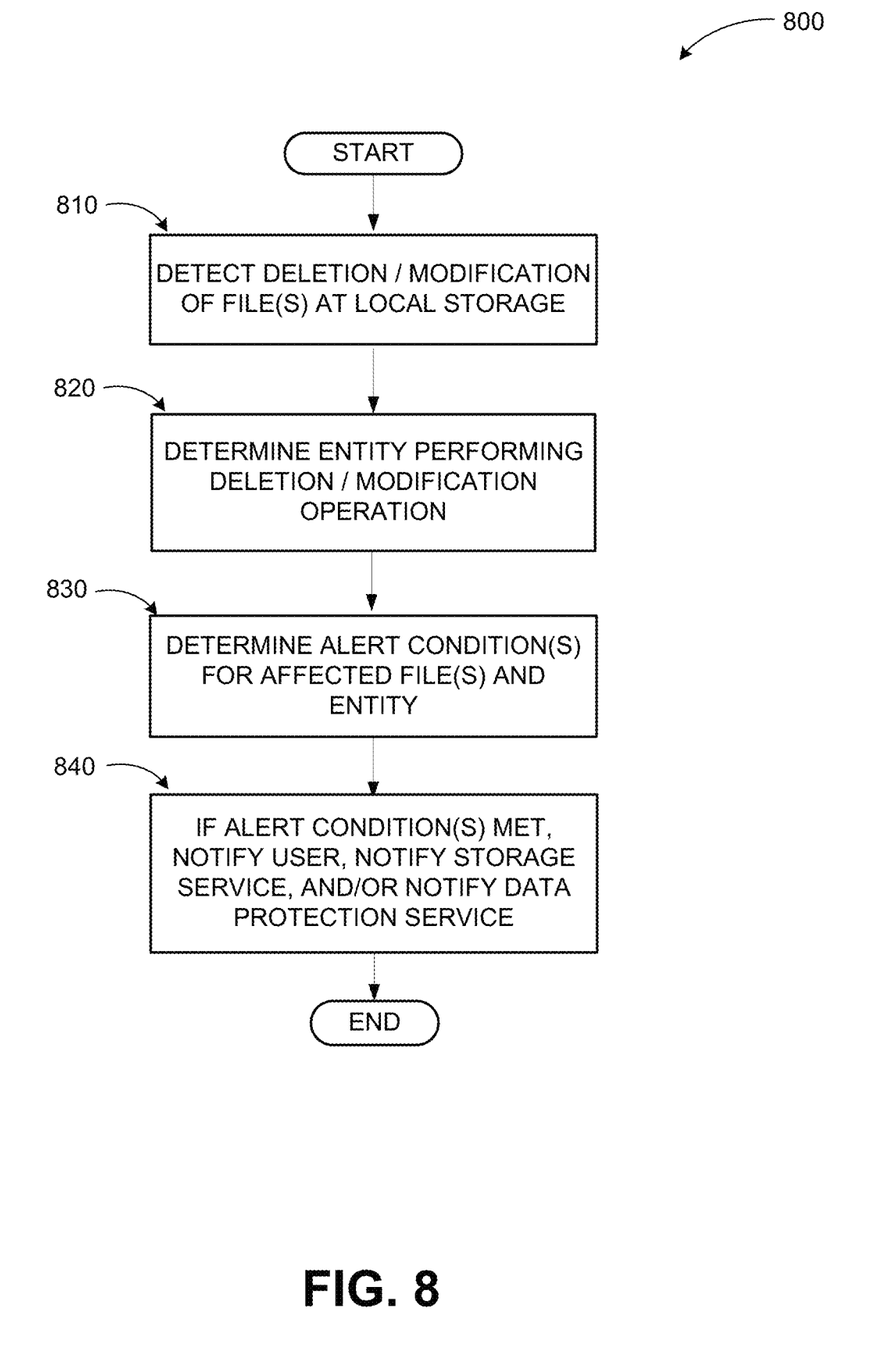
FIG. 8 illustrates a logic flow diagram of a method to provide identification of an entity performing a deletion or modification action on locally stored files and notification to mitigate risks to cloud stored files, according to embodiments.

FIG. 8 illustrates a logic flow diagram of a method to provide identification of an entity performing a deletion or modification action on locally stored files and notification to mitigate risks to cloud stored files, according to embodiments.

Process 800 may be implemented on a computing device, server, or other system. An example system may include a server comprising a communication interface to facilitate communication between a storage service and one or more devices, a memory, and one or more processors. The processors may be configured to, in conjunction with the memory, execute a storage service provided to enable storage and/or sharing of data across multiple devices and users, where access to the data stored at the storage service may be subject to a first authentication process. The storage service may also be configured to provide identification of an entity performing a deletion or modification action on locally stored files and notification to mitigate risks to cloud stored files.

Process 800 begins with operation 810, where a file watcher module or engine may detect a deletion or modification operation on one or more locally stored files. The file watcher may be part of a synchronization engine, a separate application/module, or an operating system. At operation 820, an entity performing the deletion or modification action may be identified. The entity may be an application, a process, a user other than the user that is the owner of the files, or the user himself/herself.

At operation 830, the file watcher may further determine one or more alert conditions or rules associated with the affected file(s) and/or the entity, that is under which circumstances an alert is to be issued. For example, if a file is deleted by an unknown process, a predefined percentage of files are deleted by any entity, etc., an alert may be issued. At operation 840, one or more alert notification(s) may be issued to the user, an administrator, a cloud storage service, and/or a data protection service such that protective measures can be taken if necessary.

The operations included in process 800 are for illustration purposes. Identification of an entity performing a deletion or modification action on locally stored files and notification to mitigate risks to cloud stored files may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing identification of an entity performing an operation on locally stored files and notification to mitigate risks to cloud stored files is described. The means may include a means for monitoring a plurality of files or folders in a local data storage; a means for detecting a deletion operation or a modification operation on one or more of the plurality of files or folders; a means for detecting the entity performing the deletion operation or the modification operation; a means for determining an applicable notification rule based on one or more of an affected file or folder, a performed operation, and the entity; and a means for issuing a notification that identifies the entity in response to a determination that a threshold defined by the applicable notification rule is reached.

According to some examples, a method to provide identification of an entity performing an operation on locally stored files and notification to mitigate risks to cloud stored files is described. The method may include monitoring a plurality of files or folders in a local data storage; detecting a deletion operation or a modification operation on one or more of the plurality of files or folders; detecting the entity performing the deletion operation or the modification operation; determining an applicable notification rule based on one or more of an affected file or folder, a performed operation, and the entity; and in response to a determination that a threshold defined by the applicable notification rule is reached, issuing a notification that identifies the entity.

According to other examples, the method may further include issuing the notification to one or more of a user that is a primary owner of data in the local data storage, a cloud storage service, and a data protection service. Detecting the entity performing the deletion operation or the modification operation may include detecting the entity as one of a user that is an owner of data in the local data storage, another user that is not the owner of the data in the local data storage, a local application, a local process, a remote application, and a remote process. The method may also include monitoring the plurality of files or folders at an operating system level.

According to further examples, the method may also comprise including a suggested corrective action in the issued notification. The method may further include performing a corrective action or creating a rule for a behavior of entity in a protected folder to be enforced in future; issuing the notification as one of a dialog box, a notification window, and a pane; and/or issuing the notification as one of a text message, an email, and a phone call.

According to other examples, a server to execute a storage service configured to provide identification of an entity performing an operation on locally stored files and notification to mitigate risks to cloud stored files is described. The server may include a communication interface configured to facilitate communication between the storage service and a device; a memory configured to store instructions; and one or more processors coupled to the memory. The one or more processors, in conjunction with the instructions stored in the memory, may be configured to monitor a plurality of files or folders associated with one or more users in a local data storage; detect a deletion operation or a modification operation on one or more of the plurality of files or folders; detect the entity performing the deletion operation or the modification operation as one of a user that is an owner of data in the local data storage, another user that is not the owner of the data in the local data storage, a local application, a local process, a remote application, and a remote process; determine an applicable notification rule based on one or more of an affected file or folder, a performed operation, and the entity; and in response to a determination that a threshold defined by the applicable notification rule is reached, issue a notification that identifies the entity to one or more of a user that is a primary owner of data in the local data storage, a cloud storage service, a data protection service, a data protection service client application, and a locally installed data protection application.

According to some examples, the notification rule may define a type and a format of the notification. The plurality of files or folders may be monitored in the local data storage in conjunction with a local engine. The engine may be a directory engine. The one or more processors may be further configured to in response to receiving a confirmation that the deletion or modification operation is an accidental or malicious operation, prevent synchronization of the affected file or folder with the cloud storage service. The notification rule may define the threshold based on one of a number of files and a percentage of files affected by the deletion or modification operation.

According to further examples, a system to provide identification of an entity performing an operation on locally stored files and notification to mitigate risks to cloud stored files may be described, the system may include a first server configured to execute a cloud storage service that includes a synchronization engine to synchronize the locally stored files with a cloud storage; a second server configured to execute a data protection service. The data protection service may be configured to receive a detection of a deletion operation or a modification operation on one or more monitored files or folders in a local data storage from a file watcher module; receive a detection of the entity performing the deletion operation or the modification operation from the file watcher module; determine an applicable notification rule based on one or more of an affected file or folder, a performed operation, and the entity; and in response to a determination that a threshold defined by the applicable notification rule is reached, issue a notification that identifies the entity to one or more of a user that is a primary owner of data in the local data storage, a cloud storage service, and a local data protection application.

According to yet other examples, the data protection service may be further configured to receive detection information from a plurality of file watcher modules executed on a plurality of computing devices; and determine whether the threshold is reached based on a comparison of operations and performing entities detected by the plurality of file watcher modules. The data protection service may also be configured to provide the file watcher module a configuration associated with the notification; and instruct the file watcher module to provide the notification to a user that is an owner of data in the local data storage for confirmation of whether the detected deletion operation or modification operation is accidental, malicious, or acceptable. The cloud storage service may be further configured to instruct the synchronization engine to stop synchronizing the affected file. The cloud storage service may also be configured to prevent changes to a backup storage until user instructions are received associated with a recovery of the affected file. The cloud storage service and the data protection service may be integrated.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide identification of an entity performing an operation on locally stored files and notification to mitigate risks to cloud stored files, the method comprising:
    monitoring a plurality of files or folders in a local data storage;
    detecting a deletion operation or a modification operation on one or more of the plurality of files or folders;
    detecting the entity performing the deletion operation or the modification operation, wherein detecting the entity performing the deletion operation or the modification operation includes detecting whether the entity is a non-user process or application;
    determining an applicable notification rule based on one or more of an affected file or folder, a performed operation, and the entity; and
    in response to a determination that a threshold defined by the applicable notification rule is reached and the entity is a non-user process or application, issuing a notification to a data protection service or a user, wherein the notification identifies the entity.

2. The method of claim 1, wherein the notification includes a prompt for confirming whether to automatically prevent the entity from performing subsequent deletion operation or modification operations with respect to the plurality of files or folders.

3. The method of claim 1, wherein issuing the notification to the user includes issuing the notification to a primary owner of data in the local data storage.

4. The method of claim 1, wherein detecting the entity performing the deletion operation or the modification operation comprises:
    detecting the entity as a local application, a local process, a remote application, or a remote process.

5. The method of claim 1, further comprising:
    monitoring the plurality of files or folders at an operating system level.

6. The method of claim 1, further comprising:
    including a suggested corrective action in the issued notification.

7. The method of claim 1, further comprising:
    performing a corrective action or creating a rule for a behavior of an entity in a protected folder to be enforced during a future time period.

8. The method of claim 1, further comprising:
    issuing the notification as one of a text message, an email, and a phone call.

9. A server to execute a storage service configured to provide identification of an entity performing an operation on locally stored files and notification to mitigate risks to cloud stored files, the server comprising:
    a memory configured to store instructions; and
    one or more processors coupled to the memory, the one or more processors, in conjunction with the instructions stored in the memory, are configured to:
        monitor a plurality of files or folders associated with one or more users in a local data storage;
        detect a deletion operation or a modification operation on one or more of the plurality of files or folders;
        detect the entity performing the deletion operation or the modification operation, wherein detecting the entity performing the deletion operation or the modification operation includes detecting whether the entity is a non-user process or application;
        determine an applicable notification rule based on one or more of an affected file or folder, a performed operation, and the entity; and
        in response to a determination that a threshold defined by the applicable notification rule is reached and the entity is a non-user process or application, issue a notification that identifies the entity to a data protection service or a user.

10. The server of claim 9, wherein the notification includes a prompt for confirming whether to automatically prevent the entity from performing subsequent deletion operation or modification operations with respect to the plurality of files or folders.

11. The server of claim 9, wherein the plurality of files or folders are monitored in the local data storage in conjunction with a local engine.

12. The server of claim 11, wherein the engine is a directory engine.

13. The server of claim 9, wherein the one or more processors are further configured to:
    in response to receiving a confirmation that the deletion or modification operation is an accidental or malicious operation, prevent synchronization of the affected file or folder with the cloud storage service.

14. The server of claim 9, wherein the notification rule defines the threshold based on one of a number of files and a percentage of files affected by the deletion or modification operation.

15. A system to provide identification of an entity performing an operation on locally stored files and notification to mitigate risks to cloud stored files, the system comprising:
    a first hardware server configured to synchronize the locally stored files with a cloud storage; and
    a second server configured to:

receive a detection of a deletion operation or a modification operation on one or more monitored files or folders in a local data storage from a file watcher module, receive a detection of the entity performing the deletion operation or the modification operation from the file watcher module, wherein the detection of the entity performing the deletion operation or the modification operations includes a detection of whether the entity is a non-user process or application, determine an applicable notification rule based on one or more of an affected file or folder, a performed operation, and the entity, and in response to a determination that a threshold defined by the applicable notification rule is reached and the entity is a non-user process or application, issue a notification that identifies the entity to a user or the first server.

16. The system of claim 15, wherein the second server is further configured to:

receive detection information from a plurality of file watcher modules executed on a plurality of computing devices; and determine whether the threshold is reached based on a comparison of operations and performing entities detected by the plurality of file watcher modules.

17. The system of claim 15, wherein the second server is further configured to:

provide the file watcher module a configuration associated with the notification; and instruct the file watcher module to provide the notification to a user that is an owner of data in the local data storage for confirmation of whether the detected deletion operation or modification operation is accidental, malicious, or acceptable.

18. The system of claim 15, wherein the first hardware server is further configured to stop synchronizing the affected file.

19. The system of claim 15, wherein the first hardware server is further configured to:

prevent changes to a backup storage until user instructions are received associated with a recovery of the affected file.

20. The system of claim 15, wherein the first hardware server and the second server are integrated.

* * * * *